US009203816B2

(12) United States Patent
Brueck et al.

(10) Patent No.: US 9,203,816 B2
(45) Date of Patent: Dec. 1, 2015

(54) CONTROLLING ACCESS TO COPIES OF MEDIA CONTENT BY A CLIENT DEVICE

(75) Inventors: David F. Brueck, Saratoga Springs, UT (US); Justyn T. Bye, Lehi, UT (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 12/554,730

(22) Filed: Sep. 4, 2009

(65) Prior Publication Data
US 2011/0058675 A1 Mar. 10, 2011

(51) Int. Cl.
*H04L 9/08* (2006.01)
*H04L 29/06* (2006.01)
*H04N 21/254* (2011.01)
*H04N 21/8355* (2011.01)

(52) U.S. Cl.
CPC .............. *H04L 63/062* (2013.01); *H04L 9/083* (2013.01); *H04L 29/06285* (2013.01); *H04L 29/06489* (2013.01); *H04L 29/06523* (2013.01); *H04N 21/2541* (2013.01); *H04N 21/8355* (2013.01); *H04L 2209/60* (2013.01)

(58) Field of Classification Search
CPC ............ H04N 7/173; H04N 21/47202; H04N 21/2541; H04N 21/8355; G06F 21/10; H04L 9/0483; H04L 29/06285; H04L 29/06489; H04L 29/06523; H04L 63/062
USPC ............. 380/277; 709/229; 713/193; 725/31; 726/27
See application file for complete search history.

(56) References Cited

U.S. PATENT DOCUMENTS

| | | |
|---|---|---|
| 4,535,355 A | 8/1985 | Arn et al. |
| 5,598,276 A * | 1/1997 | Cookson et al. ............... 386/241 |
| 5,953,506 A | 9/1999 | Kalra et al. |
| 6,195,680 B1 | 2/2001 | Goldszmidt et al. |
| 6,366,614 B1 | 4/2002 | Pian et al. |
| 6,490,627 B1 | 12/2002 | Kalra et al. |
| 6,574,591 B1 | 6/2003 | Kleiman et al. |
| 6,604,118 B2 | 8/2003 | Kleiman et al. |
| 6,891,953 B1 * | 5/2005 | DeMello et al. ............... 380/277 |
| 6,892,201 B2 | 5/2005 | Brown et al. |
| 6,976,090 B2 | 12/2005 | Ben-Shaul et al. |
| 7,170,999 B1 | 1/2007 | Kessler et al. |

(Continued)

FOREIGN PATENT DOCUMENTS

WO 2007133861 A2 11/2007

OTHER PUBLICATIONS

USPTO, International Searching Authority, "International Search Report" mailed Oct. 26, 2010; International Appln. No. PCT/US2010/047910, filed Sep. 3, 2010.

(Continued)

*Primary Examiner* — Jung Kim
*Assistant Examiner* — Ngoc D Nguyen
(74) *Attorney, Agent, or Firm* — Ingrassia Fisher & Lorenz, P.C.

(57) ABSTRACT

A key server for controlling access of a client device to a subset of different quality copies of media content to be delivered over a network to the client device. In one embodiment, a key server receives a request for playback permission of media content by a client device, and applies a set of one or more business rules to determine which copies of the media content, if any, can be played by the client device, and allows access to a subset of the copies that can be played back by the client device and restricts access to the copies that are not part of the subset.

24 Claims, 9 Drawing Sheets

(56) References Cited

U.S. PATENT DOCUMENTS

| | | | |
|---|---|---|---|
| 7,240,100 B1 | 7/2007 | Wein et al. | |
| 7,523,181 B2 | 4/2009 | Swildens et al. | |
| 7,770,200 B2* | 8/2010 | Brooks et al. | 725/95 |
| 2001/0042048 A1 | 11/2001 | Boykin et al. | |
| 2002/0085713 A1 | 7/2002 | Feig et al. | |
| 2002/0152318 A1 | 10/2002 | Menon et al. | |
| 2003/0014630 A1 | 1/2003 | Spencer et al. | |
| 2003/0014684 A1 | 1/2003 | Kashyap | |
| 2003/0151753 A1 | 8/2003 | Li et al. | |
| 2003/0154239 A1 | 8/2003 | Davis et al. | |
| 2004/0024688 A1 | 2/2004 | Bi et al. | |
| 2004/0059939 A1* | 3/2004 | de Jong | 713/200 |
| 2004/0083283 A1 | 4/2004 | Sundaram et al. | |
| 2004/0103444 A1 | 5/2004 | Weinberg et al. | |
| 2004/0117500 A1 | 6/2004 | Lindholm et al. | |
| 2004/0133908 A1* | 7/2004 | Smith et al. | 725/31 |
| 2004/0196972 A1 | 10/2004 | Zhu et al. | |
| 2005/0071278 A1* | 3/2005 | Simelius | 705/52 |
| 2005/0078944 A1* | 4/2005 | Risan et al. | 386/94 |
| 2005/0108414 A1 | 5/2005 | Taylor et al. | |
| 2005/0114689 A1* | 5/2005 | Strom et al. | 713/193 |
| 2005/0120107 A1 | 6/2005 | Kagan et al. | |
| 2005/0120125 A1 | 6/2005 | Morten et al. | |
| 2005/0188051 A1 | 8/2005 | Sneh | |
| 2005/0203959 A1 | 9/2005 | Muller et al. | |
| 2006/0069798 A1 | 3/2006 | Li et al. | |
| 2006/0080718 A1 | 4/2006 | Gray et al. | |
| 2006/0090082 A1 | 4/2006 | Apostolopoulos | |
| 2006/0101524 A1 | 5/2006 | Weber | |
| 2006/0156352 A1 | 7/2006 | Smith et al. | |
| 2006/0206246 A1 | 9/2006 | Walker | |
| 2007/0088603 A1* | 4/2007 | Jouppi et al. | 705/14 |
| 2007/0198414 A1* | 8/2007 | Derrenberger | 705/51 |
| 2007/0287471 A1* | 12/2007 | Wood | 455/456.1 |
| 2008/0219151 A1 | 9/2008 | Ma et al. | |
| 2008/0320560 A1 | 12/2008 | Casey et al. | |
| 2009/0028192 A1* | 1/2009 | Rieger et al. | 370/535 |
| 2010/0146091 A1 | 6/2010 | Curtis et al. | |
| 2010/0319017 A1* | 12/2010 | Cook | 725/31 |

OTHER PUBLICATIONS

USPTO "International Search Report" mailed Dec. 12, 2008; International Appln. No. PCT/US2008/061035, filed Apr. 21, 2008.

* cited by examiner

CONTROLLING ACCESS TO COPIES OF MEDIA CONTENT BY A CLIENT DEVICE

TECHNICAL FIELD

Embodiments of the invention relate to the field of delivery of media content over the Internet; and more specifically, to controlling access to copies of media content by a client device.

BACKGROUND

The Internet is becoming a primary method for distributing media content (e.g., video and audio or audio) and other information to end users. It is currently possible to download music, video, games, and other media information to computers, cell phones, and virtually any network capable device. The percentage of people accessing the Internet for media content is growing rapidly. The quality of the viewer experience is a key barrier to the growth of video viewing on-line. Even with current capacity and demand, performance can be uneven, with streams starting slowly, stopping unexpectedly, and audio tracks not always synchronizing well with video. Many of these issues can be traced to the unpredictable nature of the Internet and uncertain capacity at the consumer access level. Consumer expectations for online video are set by their television and movie viewing experiences. Appointment TV and "live" event broadcasts, whether distributed over the air, via cable, or through satellite, attract very large audiences.

Audience numbers for streaming video on the web are rapidly growing, and there are a growing interest and demand for viewing video on the Internet. Streaming of data files or "streaming media" refers to technology that delivers sequential media content at a rate sufficient to present the media to a user at the originally anticipated playback speed without significant interruption. Unlike downloaded data of a media file, streamed data may be stored in memory until the data is played back and then subsequently deleted after a specified amount of time has passed.

Streaming media content of live events (e.g., Appointment TV, live broadcast events, etc.) over the Internet have some challenges, as compared to regular broadcasts over the air, satellite, or cable. One concern that arises in the context of distribution of media content over the Internet, regardless of the method used for delivery, is how to control access to the media content. For example, in some circumstances, the media content is available for delivery at different quality levels. Some content owners may want to encode their media content at very high-quality levels, but these high-quality levels incur higher costs to encode, store, and deliver the higher quality media content. In an effort to control costs, the content owners may want to control access to the higher quality levels in certain circumstances. For example, the content owners may want to offer to paying customers the higher quality versions, while restricting access to the higher quality versions to non-paying customers. Similarly, the content owners may want to offer a demonstration video at a high quality, but restrict access to the demonstration video by the general public. In other circumstances, the content owners may want to offer a free version of the video at a lower quality to entice customers to sign up for a paid subscription, so they can view the higher quality versions. To address this concern, the content owners may decide to not encode the media content at the higher quality levels, or encode the media content at the higher quality levels, but forcibly remove the higher quality copies from the content server in order to restrict access to the higher quality levels. For example, the higher quality copies may be copied to another location and deleted from the content server. Not only is this process manual, this process can be tedious and cumbersome and eliminates the possibility of having a tiered subscription service.

Another concern with controlling access to certain quality levels of the media content is that content owners need to restrict access in a way that cannot be easily circumvented by customers. In one conventional approach, a control access mechanism is implemented in the media player on the client device. The control access mechanism may indicate that the media player should not play above a certain quality level, for example, by setting a cap on the maximum bit rate of the video that should be delivered to the client device. Unfortunately, such control access mechanisms can be circumvented by a user of the client device, such as by using a script to remove the cap on the maximum bit rate. Similarly, most conventional client-side solutions for access control can be circumvented.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
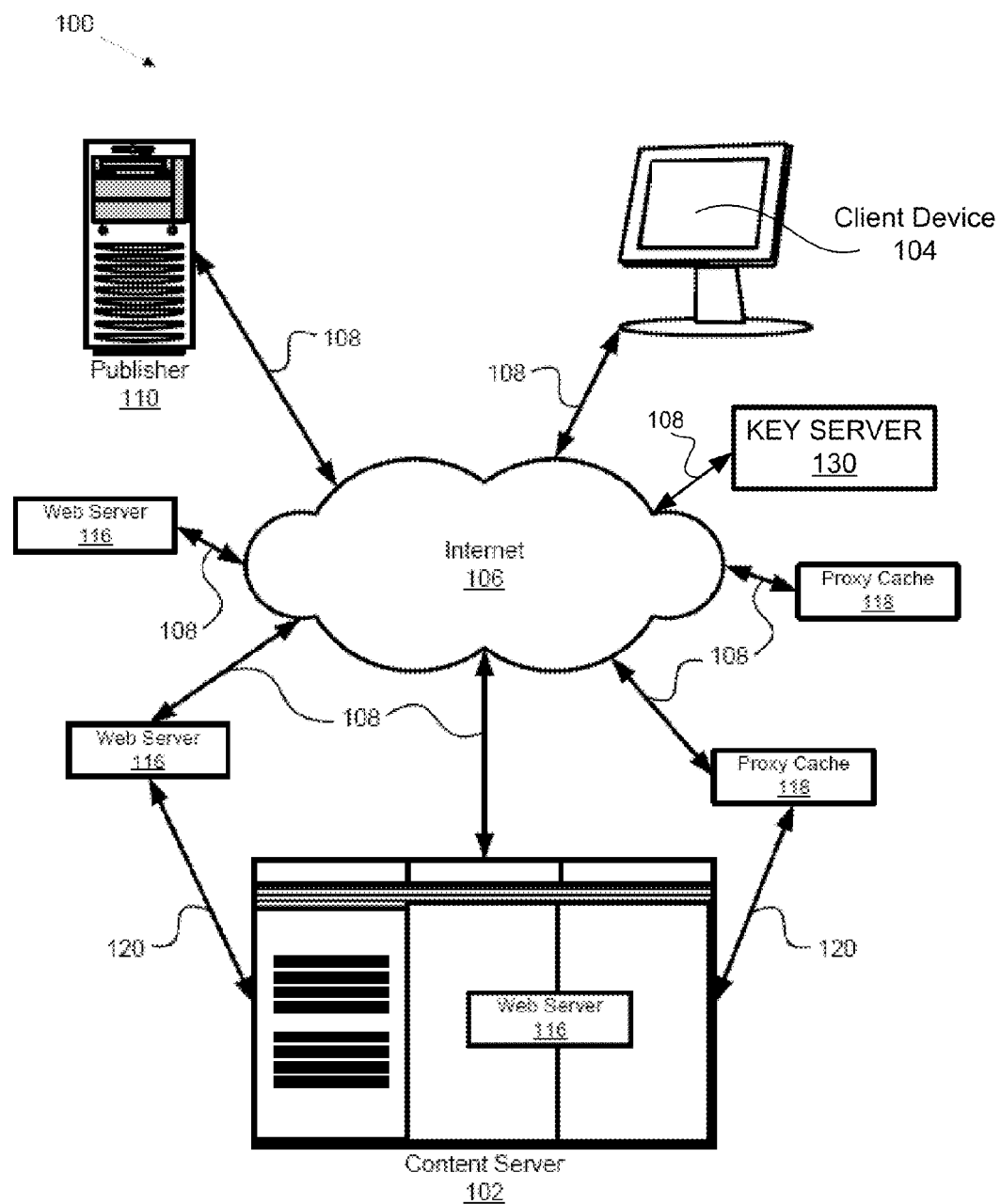
FIG. 1 is a schematic block diagram illustrating one embodiment of a computing environment in which a key server of the present embodiments may be employed.

The following description describes embodiments of a key server for controlling access to copies of media content to be delivered over a network (e.g., Internet) to the client device. In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. Many of the functional units described in this specification have been labeled as modules, engines, or managers, in order to more particularly emphasize their implementation independence. For example, a module may be implemented as a hardware circuit comprising custom integrated circuits or gate arrays, off-the-shelf semiconductors such as logic chips, transistors, or other discrete components. A module, engine, or manager may also be implemented in programmable hardware devices such as field programmable gate arrays, programmable array logic, programmable logic devices, or the like. These modules, engines, and managers may also be implemented in software for execution by various types of computing devices. An identified module of executable code may, for instance, include one or more physical or logical blocks of instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments described herein are directed at controlling access to media content to be delivered over the Internet. In one embodiment, a key server receives a request for playback permission of media content by a client device and uses information of the request to perform a set of one or more business rules to determine which of the different quality copies of the media content, if any, can be played by the client device. Based on the results of the business rules, the key server allows access to a subset of copies that can be played back by the client device and restricts access to the copies that are not part of the subset. The subset represents the copies of the media content that the requesting media player is authorized to playback. The subset can be less than all the copies of the media content, and may exclude, for example, one or more of the copies encoded at the highest quality levels. In one embodiment, the key server allows access to the subset by sending access information to the client device to allow playback of the subset of copies and to prevent playback of the copies that are not part of the subset. In one embodiment, the access information includes an encryption key for each of the copies of the subset. In another embodiment, the access information includes all the encryption keys for each copy of the media content and instructions that prevent playback of the copies that are not part of the subset. In another embodiment, the access information includes a single encryption key for all the copies of the media content and instructions that prevent playback of the copies that are not part of the subset.

The access information from the key server can also control the type of media content that can be played by a requesting media player. For example, premium subscribers could be allowed to watch a music video while non-paying users could be allowed to listen to the music but not see the music video. In another scenario, a user could preview a movie for free but not hear the audio until after paying for the movie. In one embodiment, the access information from the key server includes instructions to allow playback of audio but not the video, or vice versa. In another embodiment, the subset of keys from the key server is restricted to copies of the media that contain only audio or only video.

It should be noted that the media content is data that when processed by a media player (operating on an electronic device (i.e., client device)) allows the media player to present a visual and/or audio representation of an event to a viewer on the media player. The media player may be a piece of software that plays the media content (e.g., displays video and plays audio), and may be a standalone software application, a web browser plug-in, a combination of browser plug-in and supporting web page logic, or the like. For example, the event may be a television broadcast, such as of a sporting event, a live or recorded performance, a live or recorded news report, or the like. A live event in this context refers to media content that is scheduled to be played at a particular point in time, as dictated by a schedule. The live event may also have prerecorded content intermingled with the live media content, such as slow-motion clips of important events within the live event (e.g., replays), which are played in between the live telecast.

It should be noted that there are two main types of streaming video, video-on-demand (VOD), and live video. There are two types of live video: In some cases, the media content is played out while the content is being encoded, and the anchor point is the time that the encoding of the event began. In other cases, the media content of a live event may be pre-encoded, but scheduled to play out at a particular point in time. In either case, the playback of the content is required to occupy approximately the same amount of time as the original live event, in order to keep the playback of the media content synchronized with the schedule. VOD playback differs from live playback (sometimes referred to as live playout) in that, with VOD content, there is no anchor point in real time. A piece of VOD content begins playing when a viewer requests the VOD content. For example, an original television broadcast may be shown at a particular point in time, and subsequently, the publisher makes the television broadcast available as VOD content. In addition, since the VOD content is not anchored to a particular schedule, the advertisements in the VOD content do not have to match a scheduled duration of original advertisements in the live broadcast.

FIG. 1 is a schematic block diagram illustrating one embodiment of a computing environment 100 in which a key server 130 of the present embodiments may be employed. The computing environment 100 includes a content server 102 (also referred to as a media server or origin content server) and a client device 104. The content server 102 and the client device 104 may be coupled by a data communications network. The data communications network may include the Internet 106 and network connections 108 to the Internet 106. Alternatively, the content server 102 and the client device 104 may be located on a common Local Area Network (LAN), Personal area network (PAN), Campus Area Network (CAN), Metropolitan area network (MAN), Wide area network (WAN), wireless local area network, cellular network, virtual local area network, or the like. The client device 104 may be a client workstation, a server, a computer, a portable electronic device, an entertainment system configured to communicate over a network, such as a set-top box, a digital receiver, a digital television, or other electronic devices. For example, portable electronic devices may include, but are not limited to, cellular phones, portable gaming systems, portable computing devices, or the like. The client device 104 may have access to the Internet 106 via a firewall, a router, or other packet switching devices.

In the depicted embodiment, the computing environment 100 also includes a publisher 110 (e.g., server or content repository), and one or more web servers 116. The publisher 110 may be a creator or distributor of media content. For example, if the media content to be streamed is a broadcast of a television program, the publisher 110 may be a server of a television or cable network channel such as the ABC® channel, or the MTV® channel. The publisher may transfer the media content over the Internet 106 to the content server 102, which may be configured to receive, process, and store media content. In one embodiment, the content server 102 delivers the media content to the client device 104, which is configured to play the content on a media player that is operating on the client device 104. The content server 102 delivers the media content by streaming the media content to the client device 104. In a further embodiment, the client device 104 is configured to receive different portions of the media content from multiple locations simultaneously as described in more detail below.

Media content stored at the content server 102 may be replicated to other web servers 116; or alternatively, to proxy cache servers 118. Replicating may occur by deliberate forwarding from the content server 102, or by a web, cache, or proxy server outside of the content server 102 asking for content on behalf of the client device 104. For example, the client device 104 may request and receive content from any of the multiple web servers 116, or proxy cache servers 118. In a further embodiment, the media content may be forwarded directly to the web servers 116 or proxy cache 118 servers through direct communication channels 120 without the need to traverse the Internet 106. In another embodiment, the web servers 116, proxy caches 118, and content server 102 may be organized in a hierarchy of a content delivery network (CDN) to deliver the media content to the client device 104. As described above, a CDN is a system of computers networked together across the Internet 106 that cooperates transparently to deliver content. In this embodiment, the content server 102 is the origin content server of the CDN. The CDN may also include interconnected computer networks or nodes to deliver the media content.

In one embodiment, the publisher 110 stores the media content in an original content file to be distributed. The content file may include data corresponding to video and/or audio corresponding to a television broadcast, sporting event, movie, music, concert, or the like. The original content file may include uncompressed video and audio; or alternatively, uncompressed video or audio. Alternatively, the content file may include compressed content (e.g., video and/or audio) using standard or proprietary encoding schemes. The original content file from the publisher 110 may be digital in form and may include media content having a high bit rate, such as, for example, approximately 5 Mbps or greater.

The content server 102 may receive the content file from the publisher 110, and decompress the content file (if encoded) into raw audio and/or video. In one embodiment, the content server 102 segments the raw audio and/or video of the content file into multiple portions of the content (e.g., streamlets) as described below. The portions may have an equal duration; or alternatively, the portions may have equal file sizes, or vary one to another according to other requirements. Each portion of the content may then be encoded into multiple encoded representation of the same portion of content. The multiple encoded representations may be encoded according to different quality profiles and stored as separate files that are independently requestable and independently playable by the client device 104. Each of the files may be stored in any one or all of the content server 102, the web servers 116, and the proxy caches 118, and may be separately requested and delivered to the client device 104. In another embodiment, the content server 102 segments streams (e.g., different quality copies) of the media content that have already been encoded into portions of the media content.

In the depicted embodiment, the computing environment 100 also includes a key server 130, sometimes referred to as a Digital Rights Management (DRM) server. The key server 130 provides access control information to the client device 104 to control access to a subset of all the copies of the requested media content to be delivered over the Internet 106. When the media content has been encoded and stored on the content server 102, the key server 130 receives access information, such as, for example, encryption key(s) to control access to the media content stored on the content server 102. For example, the key server 130 may receive a request for playback permission from a media player operating on the client device 104. Using information in the request, the key server 130 applies a set of one or more business rules to determine which of the different quality copies, if any, the client device 104 is authorized to playback. In one embodiment, the media content is identified using a unique content identifier (UCID). The key server 130 uses the UCID to locate the encryption key(s) associated with the particular UCID. For example, when a user selects a particular video to view, the media player may send a request to the key server 130 that includes the UCID corresponding to the requested video. The key server 130 may perform a lookup operation using the UCID and the user's information, such as unique user identifier (UUID) to determine which of the different quality copies, the media player can playback on the client device 104.

In other embodiments, the computing environment 100 may include other devices, such as directory servers, management servers, messaging servers, statistic servers, devices of a network infrastructure operator (e.g., an ISP), or the like.

As described above, in one embodiment, the media content is segmented into portions of the media content, referred to herein as streamlets. The term "streamlet," as used herein, refers to a single encoded representation of a portion of the video. Each streamlet may be an individual file that includes a portion of the media, and may be encapsulated as an independent media object, allowing the streamlet to be cached individually and to be independently requestable and independently playable by a media player. These individual files are referred to herein as QSS files. In one embodiment, a streamlet is a static file that can be served by a non-specialized server, instead of a specialized media server. In one embodiment, the media content in a streamlet may have a predetermined length of playback time. The predetermined length of time may be in the range of between about approximately 0.1 and 5.0 seconds, for example. The media content in the streamlet may have a unique time index in relation to the beginning of the media content contained in a stream. Alternatively, the streamlets may be divided according to a file size, instead of a time index. The term "stream," as used herein, may refer to a collection of streamlets of the video encoded by the same video quality profile, for example, portions of the video that have been encoded at the same video bit rate. The stream represents a copy of the original media content. The streamlets may be stored as separate files on any one or more of the web servers 116, or the proxy caches 116, or other devices within a CDN. The separate files (e.g., streamlets) may be requested by the client device 104 from the web server using HTTP. Using a standard protocol, such as HTTP, eliminates the need for network administrators to configure firewalls to recognize and pass through network traffic for a new, specialized protocol, such as Real Time Streaming Protocol (RTSP). Additionally, since the media player initiates the request, a web server, for example, is only required to retrieve and serve the requested streamlet, not the entire stream. The media player may also retrieve streamlets from more than one web server. These web servers may be without specialized server-side intelligence to retrieve the requested portions. In another embodiment, the streamlets are stored as separate files on a cache server of a network infrastructure operator (e.g., an ISP), or other components of a CDN. Although some of the present embodiments describe the use of streamlets, the embodiments described herein are not limited to use in computing systems that use streamlets, but may also be implemented in other systems that use other techniques for delivering live media content over the Internet 106. For example, in another embodiment, the media content is stored in a single file that is divided into portions that can be requested using HTTP range requests and cached in the CDN.

There are two general types of media streaming, namely push-based streaming and pull-based streaming. There are additional problems that may arise based on the type of media streaming technology used to deliver the media content. Push technology describes a method of Internet-based communication where the request for a given transaction is initiated by the server, such as a publisher's content server. Pull technology, in contrast, describes a method of Internet-based communication where the request for transmission of information is initiated by the client device, and then is responded to by the server. One type of request in pull technology is a HTTP request (e.g., HTTP GET request). In contrast, in push-based technology, typically a specialized server uses specialized protocol, such as RTSP to push the data to the client device. In pull-based technology, a CDN may be used to deliver the media to multiple client devices. The CDN is a system of computers networked together across the Internet 106 that cooperates transparently to deliver content, and may include, for example, an origin content server, web servers, cache servers, etc. Typically, the CDN is configured in a hierarchy so that a client device requests the data from an edge cache, for example, and if the edge cache does not contain the requested data, the request is sent to a parent cache, and so on up to the origin content server. Some examples of CDNs would be CDNs developed by Akamai Technologies, Level3 Communications, or Limelight Networks. Alternatively, other CDNs may be used. FIG. 2B illustrates a computing environment in which the key server 130 could be implemented in a pull-based or a push-based configuration. FIG. 2C illustrates a computing environment in which the key server 130 could be implemented in a pull-based configuration. Alternatively, other configurations such as pushed-based configuration may be used. It should be noted that although various embodiments described herein are directed to a pull-based model, the embodiments may be implemented in other configurations, such as a push-based configuration. In the push-based configuration, the embodiments of the conditional access mechanism can control access to a subset of the copies that can be played back by the client device including restricting access to the copies of the plurality of copies that are not part of the subset. These embodiments can be used to provide tiered quality levels. One difference may be that, in the push-based model, the application of business rules can happen in the same machine (e.g., server) as the one deciding what quality content to deliver to be played by the client device. Although not required to be implemented in the same machine, the application of business rules can be performed by a separate module than the module performing the decision of what quality to deliver to the client device for playback.

Figure 2A:
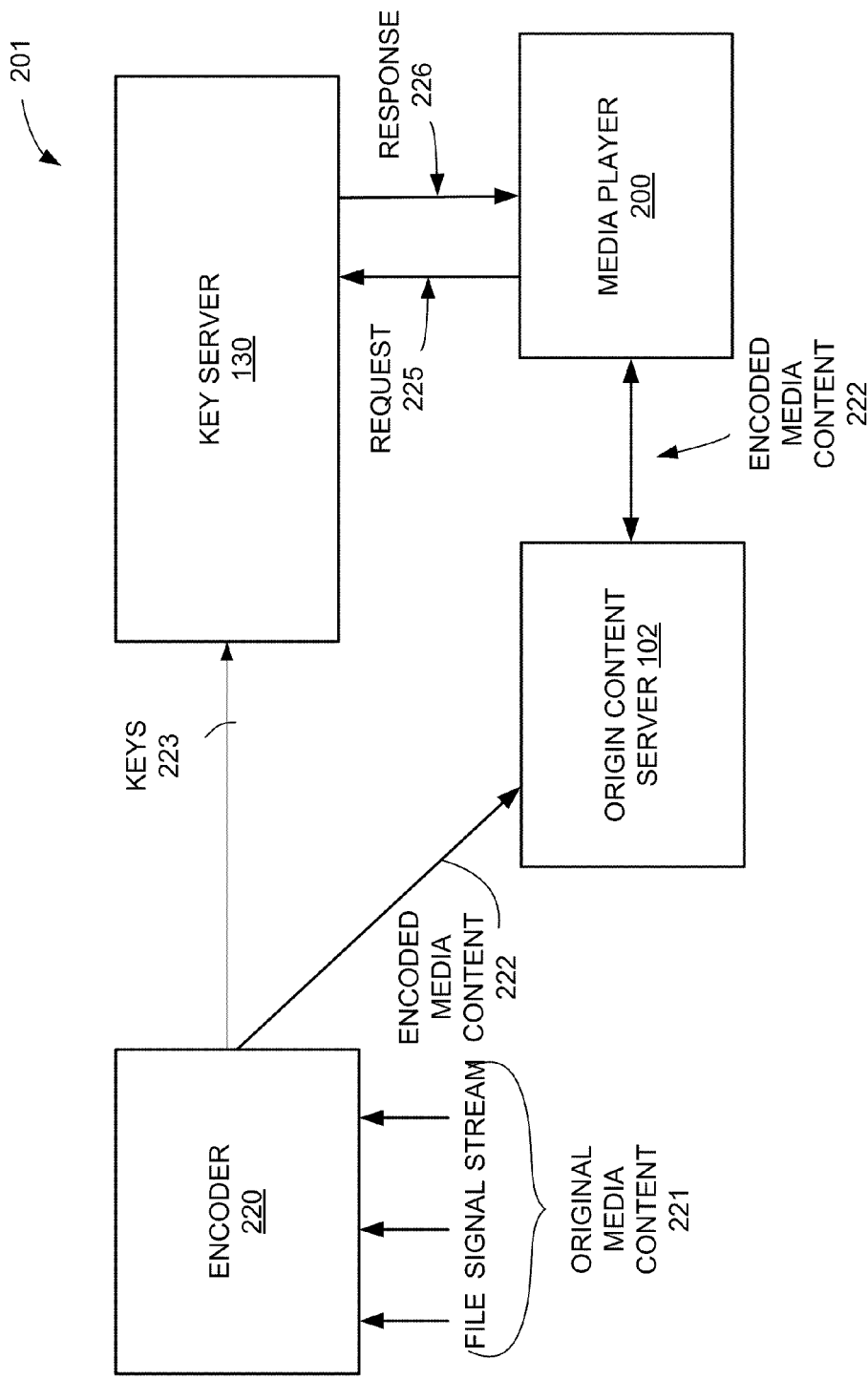
FIG. 2A is a schematic block diagram illustrating one embodiment of a computing environment in which the key server of FIG. 1 may be employed.
Figure 2B:
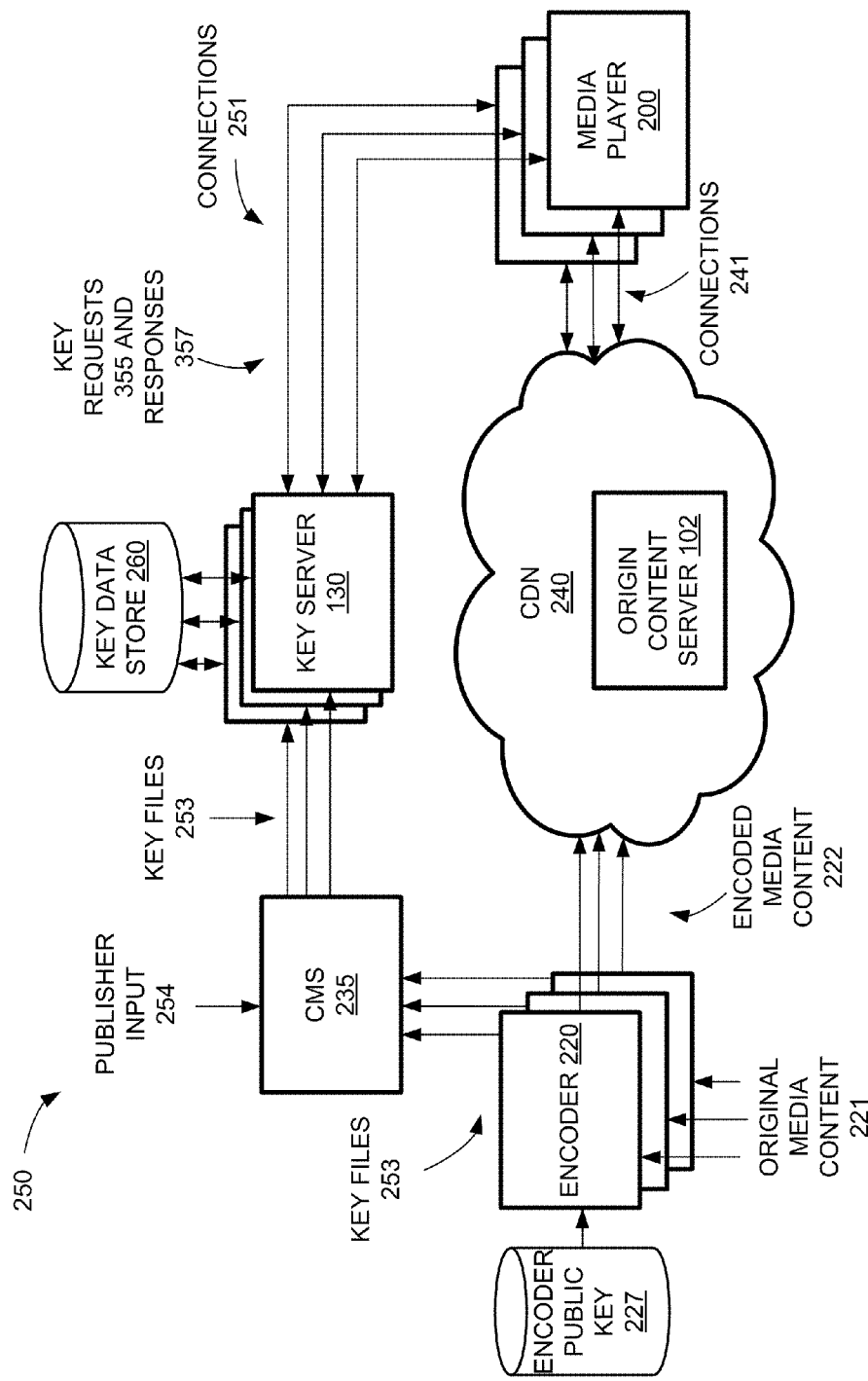
FIG. 2B is a schematic block diagram illustrating another embodiment of a computing environment in which the key server of FIG. 1 may be employed.

FIG. 2A is a schematic block diagram illustrating one embodiment of a computing environment in which the key server 130 of FIG. 1 may be employed. The computing environment 201 includes the key server 130 of FIG. 1, an encoder 220, an origin content server 210, and a media player 200, operating on a client device, such as the client device 104. The encoder 220 receives the original media content 221, for example, by receiving an original content file, as described above, a signal from a direct feed of the live event broadcast, a stream of the live television event broadcast, or the like. In one embodiment, the encoder 220 receives the original media content 221 as one or more content files from a publishing system (not illustrated) (e.g., publisher's server or publisher's content repository). Alternatively, the encoder 220 receives the original media content 221 as it is captured. For example, the encoder 220 may receive a direct feed of the live television broadcast, such as a captured broadcast, in the form of a stream or a signal. The original media content 221 may be captured by a capture card, configured for television and/or video capture, such as, for example, the DRC-2600 capture card, available from Digital Rapids of Ontario, Canada. Alternatively, any capture card capable of capturing audio and video may be utilized with the present invention. The capture card may be located on the same server as the encoder; or alternatively, on a separate server. The original media content 221 may be a captured broadcast, such as broadcast that is being simultaneously broadcasted over the air, cable, and/or satellite, or a pre-recorded broadcast that is scheduled to be played at a specific point in time according to a schedule of a live event. The encoder 220 may utilize encoding schemes such as DivX® codec, Windows Media Video 9® series codec, Sorenson Video® 3 video codec, TrueMotion VP7 codec from On2 Technologies®, MPEG-4 video codecs, H.263 video codec, RealVideo 10 codec, OGG Vorbis, MP3, or the like. Alternatively, a custom encoding scheme may be employed.

The encoder 220 encodes and encrypts the original media content 221 and sends the encoded media content 222 to the origin content server 210, which delivers the encoded media content 222 to the media player 200. The encoded media content 222 is encrypted using one or more encryption keys. In one embodiment, all copies of the media content 222 are encrypted using a single encryption key. In another embodiment, each copy of the media content 222 is encrypted using its own encryption key. In either case, the encoder 220 sends the key or keys 223 to the key server 130. When the key server 130 receives a request 225 for playback permission of the media content 222 by the media player 200, the key server 130 applies a set of one or more business rules to determine which of the copies, if any, can be played back on the media player 200, and sends a response 226 to the media player 200. The response 226 includes access information to allow access to a subset of all the copies that can be played back by the media player 200, and to restrict access to the copies that are not part of the subset. In one embodiment, the response 226 includes an encryption key for each of the copies of the subset to allow playback of the subset of copies by the media player 200. In another embodiment, the response 226 includes all the encryption keys 223 for all the copies and instructions that prevent playback of the copies that are not part of the subset by the media player 200. In another embodiment, the response 226 includes a single encryption key for all the copies and instructions that prevent playback of the copies that are not part of the subset by the media player 200. Additional details regarding the instructions are described below with respect to FIG. 3.

In one embodiment, the encoder 220 segments the media content into portions of the media event, each portion encoded according to a different quality profile, such as the ten QSS files having two-second durations encoded according to the ten different quality profiles, described above in one embodiment. In one embodiment, the encoder 220 simultaneously encodes and encrypts the original content media 221 at several different quality levels, for example, ten or thirteen such levels. Each quality level is referred to as a quality profile or a profile. In one embodiment, before the encoder 220 begins encoding a piece of media content, the encoder 220 generates an encryption key per profile. Each profile is therefore encrypted with its own unique key. In one embodiment, the per-profile keys are written to a key file that is identified by the unique content identifier (UCID) of the original media content 221. The individual profile keys may be encrypted in the key file. The manner in which these keys are encrypted may differ based on versions of the key server. Alternatively, the encoder 220 generates a single encryption key that is the same for each profile, and this key is written to a key file and sent to the key server 130. Alternatively, the single encryption key or the per-profile keys are sent directly to the key server without being written to a key file. The single encryption key may be identified by the UCID, and may be encrypted. Once the key file has been generated, the encoder 220 sends the key file containing the keys 223 to the key server 130. Alternatively, the encoder 220 sends the keys 223, or a key file containing the key 223, to the key server after the encoder 220 has finished encoding at least the first portion (e.g., ten different quality QSS files of the same two-second portion) of the original media content 221, so the media player 200 can start requesting the media content. The encoder 220 may also specify which quality profiles are available for the particular portion of the media content, and may specify how much of the media content is available for delivery, for example, using a QMX file. The QMX file indicates the current duration of the media content represented by the available QSS files. The QMX file may operate as a table of contents for the media content, indicating which QSS files are available for delivery, and from where the QSS files can be retrieved. The QMX file may be sent to the media player 200 via the key server 130 or by way of the origin content server 102. Alternatively, the media player 200 can request the available quality profiles for the particular media content. In other embodiments, this configuration can be scaled using the scaling capabilities of CDNs to deliver HTTP traffic to multiple media players. For example, a data center that stores the encoded media content may have a cluster of key servers 130 and/or origin content servers 102 to service multiple media players that request the encoded media content from the data center. Alternatively, other configurations may be used as would be appreciated by one of ordinary skill in the art having the benefit of this disclosure.

In one embodiment, the encoder 220 is implemented in the same device as a publishing system (not illustrated). In another embodiment, the key server 130 is implemented in the same device as the publishing system. Alternatively, other configurations may be used as would be appreciated by one of ordinary skill in the art having the benefit of this disclosure.

In one contemplated embodiment, the media player may request portions of the media content by requesting individual streamlet files (e.g., QSS files). The media player requests the QSS files according to a metadata descriptor file (e.g., QMX file). The media player fetches a QMX file, for example, in response to a user selecting the media content for presentation, and the media player reads the QMX file to determine when to start playback of the media content using the current duration, and where to request the QSS files. For example, if the media content has a one-hour duration and the media content is segmented into QSS files having two-second durations, there are 1800 QSS files for each encoded representation of the media content. If the media content is encoded according to ten different quality profiles, there are 18,000 QSS files for the media content. The quality profiles may indicate how the stream is to be encoded, for example, the quality profiles may specify parameters, such as width and height of the image (i.e., image size), video bit rate (i.e., rate at which the video is encoded), audio bit rate, audio sample rate (i.e., rate at which the audio is sampled when captured), number of audio tracks (e.g., mono, stereo, or the like), frame rate (e.g., frame per second), staging size, or the like. The QMX file includes a QMX timestamp, such as a UTC (Coordinated Universal Time) indicator, which indicates when the encoding process started (e.g., start time of the media content), and a current duration that indicates how much of the media content is available for delivery. For example, the QMX timestamp may indicate that the encoding process started at 6:00 pm (MDT), and 4,500 QSS files of the media content are available for delivery. The media player can determine that the content duration (live playout) is approximately fifteen minutes, and decide to start requesting QSS files corresponding to the playback of the program at fifteen minutes into the program or slightly before that point. In one embodiment, the media player can determine the point in the media content at which the media player should start playing the content by fetching the corresponding streamlets at that offset into the media content. Each time the encoder stores another set of QSS files on the content server (e.g., set of ten QSS files representing the next two seconds of media content at the ten different quality profiles), the QMX file is updated that can be fetched by the media player to indicate that two more seconds are available for delivery over the Internet 106. The media player can periodically check for updated QMX files. Alternatively, the QMX file and any updates may be pushed to the media player to indicate when the media content is available for delivery over the Internet 106.

FIG. 2B is a schematic block diagram illustrating one embodiment of a computing environment in which the key server 130 of FIG. 1 may be employed. The computing environment 250 includes a set of key servers 130 of FIG. 1, a set of encoders 220, a content management system (CMS) 235 (also referred to as a publishing system), a CDN 240, a key data store 260, and multiple media players 200, each operating on a client device, such as the client device 104. The CDN 240 includes the origin content server 210. In this embodiment, the set of encoders 220 receives the original media content 221.

In one embodiment, the set of encoders 220 segments the content files of the original media content 221 into multiple streamlets according to multiple video quality profiles. The corresponding streamlets of different quality levels may have the same duration and same time index, for example. The set of encoders 220 provides the encoded media content 221 to a CDN 240. The CDN 240 stores and delivers the encoded media content 221 that has been encoded by the encoder 220. In particular, the set of media players 200 requests and receives the media content 222 from the CDN 240 over the connections 241. It should be noted that, although one line has been illustrated for each media player 200, each line may represent multiple network connections to the CDN 240. In one embodiment, each media player 200 may establish multiple Transport Control Protocol (TCP) connections to the CDN 240. In another embodiment, the media content is stored in multiple CDNs, for example, stored in the origin servers associated with each of the multiple CDN. The CDN 240 may be used for the purpose of improving performance, scalability, and cost efficiency to the end users (e.g., viewers) by reducing bandwidth costs and increasing global availability of content. CDNs may be implemented in various manners, and the details regarding their operation would be appreciated by one of ordinary skill in the art. As such, additional details regarding their operation have not been included. In other embodiments, other delivery techniques may be used to deliver the media content to the media players from the origin servers, such as peer-to-peer networks, or the like.

The media players 200 can request and receive the encoded media content 222 from the CDN 240 over connections 241. The media players 200 may individually request different quality levels of the same media content 222; for example, each media player 200 may request the same portion (e.g., same time index) of the media content 222, but at different quality levels. For example, one media player may request a streamlet having HD quality video, since the computing device of the requesting media player has sufficient computational power and sufficient network bandwidth, while another media player may request a streamlet having a lower quality, since its computing device may not have sufficient network bandwidth, for example. In one embodiment, the media player 200 shifts between quality levels at the portion boundaries by requesting portions from different copies (e.g., different quality streams) of the media content, as described in U.S. Patent Application Publication No. 2005/0262257, filed Apr. 28, 2005. Alternatively, the media player 200 can request the portions using other techniques that would be appreciated by those of ordinary skill in the art having the benefit of this disclosure.

The computing environment 250 includes the Content Management System (CMS) 235. The CMS 235 is a publishing system that manages the encoded media content 220, for example, using a database, and allows a publisher to generate timelines (referred to herein as a virtual timeline (QVT)) to schedule the playback of the media content. The CMS 235 may also allow a user to modify the timeline, for example, to insert advertisements, to modify start and end times, to modify content durations, etc. The timeline may indicate when the media content is available for delivery over the Internet 106 to be requested by the media player, and may indicate when the media player should play the media content. For example, the timeline may specify a starting time of the media content, and a current duration of the media content to allow playback of the media content, for example, according to the schedule. In the example above, the encoder is currently updating the CMS with information about streams (e.g., copies of the media content) to indicate that certain portions of the stream (e.g., streamlets) have been sent to the origin content server associated with the CDN. In this embodiment, the CMS 235 receives information from the encoder 220, such as, for example, any of the following: the encryption keys; availability information that indicates that the set of encoders 220 has sent portions of the encoded media content 222 to the origin content server 210; information that indicates what quality levels are available for a particular portion of the media content 222; metadata, including, for example, air date of the content, title, actresses, actors, a start index, an end index, proprietary publisher data, encryption level, content duration, episode or program name, publisher; available tools for the end-user navigational environment, such as available menus, thumbnails, sidebars, advertising, fast-forward, rewind, pause, and play, or the like; or bit-rate values, including frame size, audio channel information, codecs, sample rate, and frame parser information. Alternatively, the encoder 220 may send more or less information, but at least the encoder 220 sends the keys 253 to the CMS 235 or to at least one of the key servers 130.

As described above, in one embodiment, before the encoder 220 begins encoding the original media content 221, the encoder 220 generates an encryption key per profile or a single encryption key for all the profiles, and writes per-profile keys to a key file 253. The encryption keys in the key file can also be encrypted. Once the key file 253 has been generated, the encoder 220 transfers the key file 253 to the CMS 235, which may represent the publisher's instance of the CMS. The encoder 220 can transfer the key file 253 to the CMS 235, for example, using HTTP. The CMS 235 then transfers the key file 235 to one of the key servers 130, for example, using secure copy protocol (SCP). In one embodiment, the storage for the key server 130 is storage that is shared among the key servers 130 at a particular data center, for example, key data store 260. In this embodiment, the CMS 235 sends the key file 253 to one of the key servers 130, and the receiving key server 130 sends the key file 253 to a key server at each of the other data centers. In another embodiment, the key file storage is local to each of the key storage servers 130. In this embodiment, the receiving key server sends the key file 253 to each other key server 130, regardless of the data center in which it is located. In either version, the end result is that each key server 130 has a copy of each key file. Thus, client key requests can be directed to any key server 130.

In the depicted embodiment, the media players 200 send key requests 355 to the key servers 130 over the connections 251, and the key servers 130 send response 357 to the requested media player over the connections 251. The responses 357 may include all the encryption keys, a subset of the encryption keys, or a single encryption key. In other embodiments, the responses 357 include instructions that the requesting media player 200 should obey. Additional details regarding the instructions are described below with respect to FIG. 3.

It should be noted that although the origin content server 210 has been illustrated as being within the CDN 240, the origin content server 210 may reside outside of the CDN 240 and still be associated with the CDN 240. For example, one entity may own and operate the content server that stores the streamlets, but the CDN 240, whose devices may be owned and operated by one or more separate entities, delivers the streamlets.

In one embodiment, the CMS 235 also receives publisher input 254. In one embodiment, the CMS 235 generates metadata for the encoded media content 222, such as a virtual timeline (QVT). The QVT may define a playlist for the viewer. The QVT may represent a day, a week, a month, etc. worth of programming; or alternatively, may represent just the requested program. For example, the QVT may indicate the schedule, such as designated when to start playing certain portions of the media content using the media player 200, and when to stop playing the media content for advertisement breaks, which may be filled by one or more advertisements selected by the media player 200. The QVT may also be intermingled with live and non-live content. The CMS 235 may use the publisher input 254 to generate virtual timelines to schedule the playback of the live media content. The timeline may also indicate when the encoded media content 221 is available for delivery over the Internet 106 to be requested by the media players 200, and may indicate when the media players 200 should play the media content. For example, the timeline may specify a starting time of the media content 222, and a current duration of the media content 222 (e.g., amount of available portions of the media content available for delivery) to allow playback of the media event according to the schedule. In the example above, the set of encoders 220 is currently updating the CMS 235 with information about streams to indicate that certain portions of the stream have been sent to the origin content server 210 associated with the CDN 240.

Figure 3:
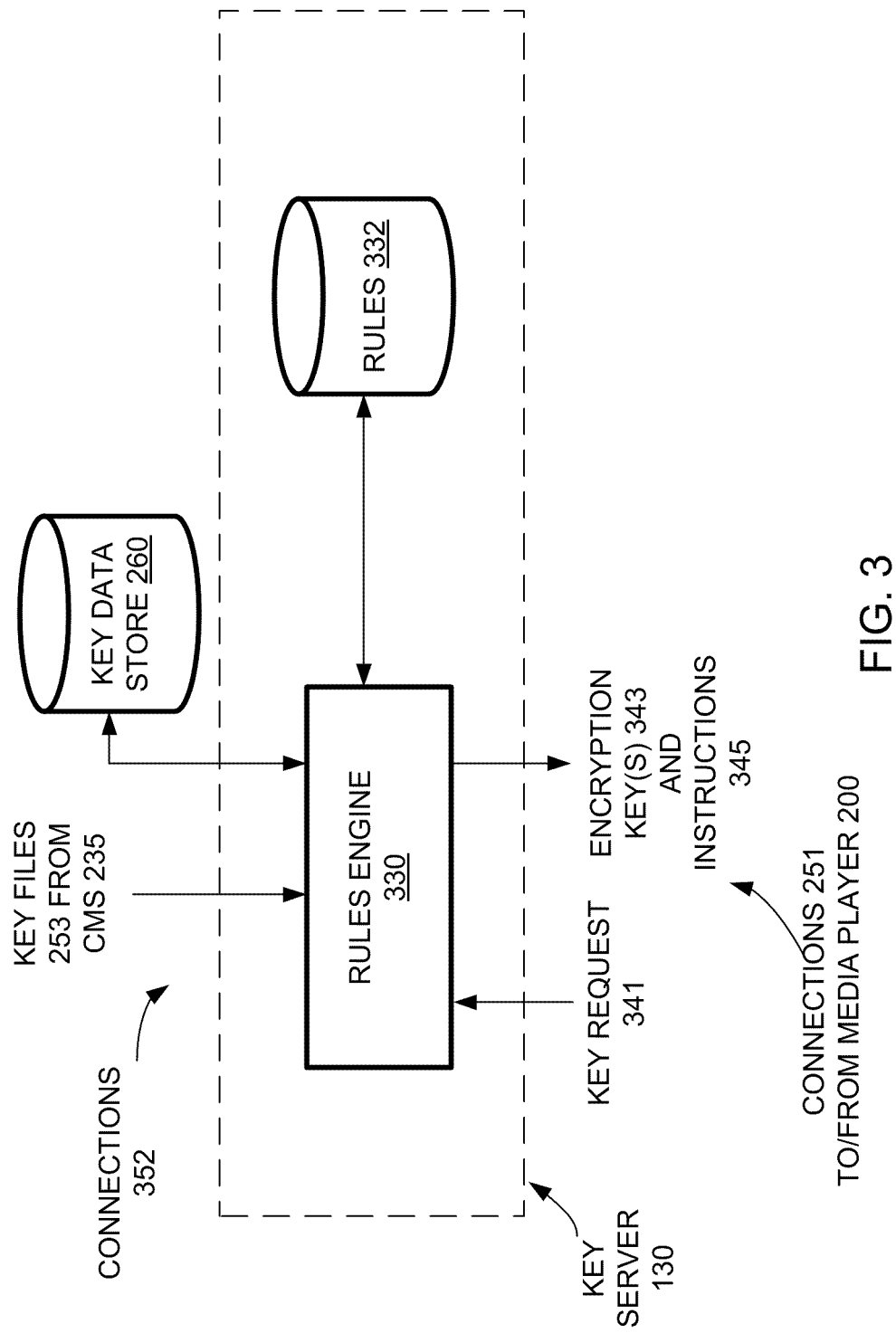
FIG. 3 is a schematic block diagram illustrating one embodiment of the key server of FIG. 2B.

FIG. 3 is a schematic block diagram illustrating one embodiment of the key server 130 of FIG. 2B. As depicted, the key server 130 includes a rules engine 330 and a rules data store 332. The rules engine 330 receives key requests 341 from any number of the media players 200 over the connection 251. Upon receiving the key request 351, the rules engine 330 uses the information of the request 341 to perform a set of one or more business rules to determine which of the copies, if any, can be played back on the client device. In one playback scenario, the media player 200 asks the key server 130 if it can play the encrypted content. If the business rules allow playback, the key server 130 sends back the encryption keys 343 for all, or a subset of all, of the quality levels, and the media player may select which quality level to play based on the user's bandwidth or the user's computational load, for example.

The key server 130 receives the information from the key request 341 and applies business rules to determine whether or not the key request 341 will be honored. The business rules can be as simple or complex as desired. In the simplest case, the answer is always "yes" to allow playback of all copies. For example, in one typical scenario, one of the business rules can determine whether the media player 200 is in an approved geographic area in order to receive the encryption keys 343. In this example, the answer may depend on the network address (e.g., Internet Protocol (IP) address) of the media player 200. In one embodiment, the key server 130 extracts the IP address from the key request 341 to determine if the media player 200 is in an approved geographic area by looking up the IP address in a geographic database as those provided by Quova, NetAcuity, or MaxMind, for example. Some customers may have more complex business rules. Alternatively, other types of business rules may be implemented as would be appreciated by one of ordinary skill in the art having the benefit of this disclosure.

In another embodiment, the media player 200 receives a token from a server of a content service provider or from some other party that gives authorization to access content. The media player 200 submits the token with the key request 341. The rules engine 330 validates the token as part of the business rule processing. In another embodiment, the rules engine 330, as part of the business rule processing can communicate with external servers. For example, in one embodiment, the rules engine 330 can request a subscription level from a remote server (not illustrated) for the particular media player 200 and receive a response that indicates the subscription level. The subscription level can be used to determine which of the copies, if any, can be played by the media player 200. Alternatively, the rules engine 330 can make requests to other external servers for other purposes in order to perform the business rule processing.

In one embodiment, the business rules resolve to a "yes," "no," or "defer," for which playback is either allowed, or it is not. The defer response allows the process to proceed to a subsequent business rule to determine whether playback is allowed. In another embodiment, the business rules resolve to a "yes," "limited yes," "no," or "defer." Using these results, the business rules could dictate that playback is allowed, but that only a subset of the copies is accessible to the media player 200. Instead of returning all the keys, the rules engine 330 could then return some of the encryption keys 343 instead of the full set. In one embodiment, the media player 200 is configured to ignore the quality levels for which it does not have encryption keys, and would then perform quality selection of the media content for adaptive streaming using just the subset of copies for which it does have encryption keys. For example, the media player 200 can determine that there are thirteen available quality profiles for the media content, but receive encryption keys to the lower ten quality levels. Although there are thirteen "available quality profiles," only ten of these profiles are considered "working quality profiles." Alternatively, the media player 200 can consider the ten profiles for which it has encryption keys as the available quality profiles.

The rules may be stored in a rules data store 332, such as a rules database, which is coupled to the rules engine 330. An administrator may create, modify, or delete rules that are stored in the rules data store 332. For example, a publisher may use the CMS 235 to create, modify, or delete the set of rules for a particular media content. It should be noted that although the rules data store 332 has been illustrated as being part of the key server 130, in other embodiments, the rules data store 332 can reside outside of the key server 130. In one embodiment, the rules engine 330 is coupled to the key data store 260, and the rules engine 330 receives from the CMS 235 or the encoders 220 the key files 253 or just the encryption keys themselves, and stores them in the key data store 260 according to the UCID of the media content. The key request 341 may include the UCID to identify which keys are being requested. The key request 351 may also include the UUID to identify the user or the user or the media player 200 requesting keys for the UCID. The rules engine 330 can look up the keys and then send only the keys 343 that correspond to the subset that the requesting media player 200 is authorized to play.

As described herein, in some embodiments, the rules engine 330 can also send one or more instructions 345 with a single encryption key or with multiple encryption keys to the media player 200. The instructions 345 can be used to prevent playback of the copies that are not part of the subset. In one embodiment, the instructions 345 specify which copies, if any, can be played back by the media player 200. For example, the instructions 345 may indicate to the media player 200 to "use only profiles 1-10 of 13 profiles." In another embodiment, the instructions 345 specify a minimum or maximum criterion to prevent playback of copies that do not meet the minimum or maximum criterion. For example, the instructions 345 may indicate to the media player 200 to "not use any profile that exceeds a bitrate of 1 Mbps." In another embodiment, the instructions 345 specify a maximum duration of permitted playback of one or more of the copies. For example, the instructions 345 may indicate to the media player 200 to "play high quality profiles for five minutes." Alternatively, other instructions may be used as would be appreciated by one of ordinary skill in the art having the benefit of this disclosure.

Although there may be some flexibility in having a single encryption key for all the copies, this approach may be less secure because this approach relies on the media player 200 not being compromised by a hacker. When each of the copies has an individual encryption key and only a subset of the encryption keys is sent to the media player 200, there may be more security because the media player 200 simply does not receive the encryption keys that are not part of the subset, preventing the media player 200 from playing back those copies.

Figure 4:
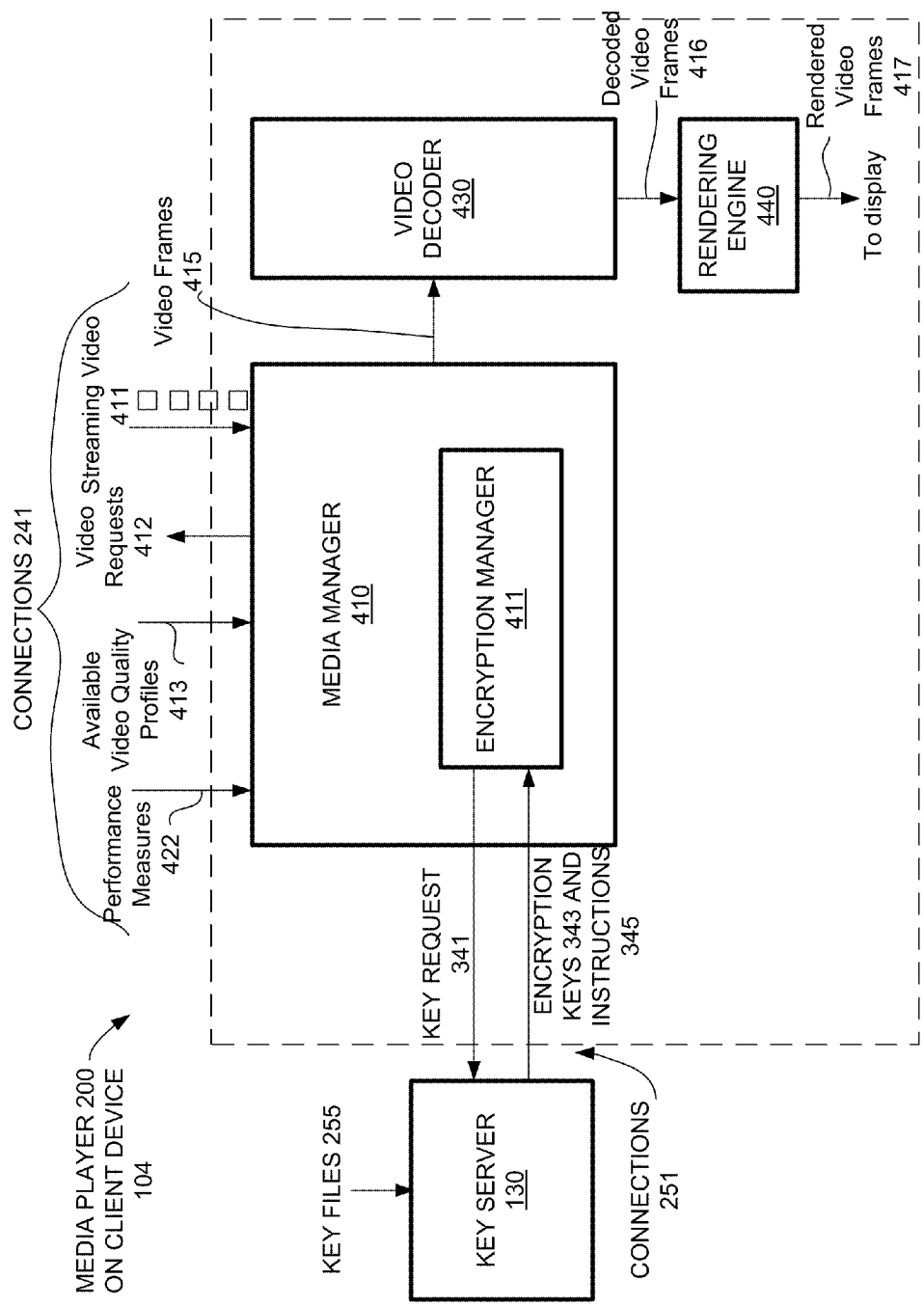
FIG. 4 is a schematic block diagram illustrating one embodiment of a media player coupled to the key server of FIG. 2B.

FIG. 4 is a schematic block diagram illustrating one embodiment of a media player 200 coupled to the key server 130 of FIG. 2B. The media player 200 includes a media manager 410, an update manager 420, an encryption manager 411, a video decoder 430, and a rendering engine 440.

In the depicted embodiment, the media manager 410 is coupled to the video decoder 430. The media manager 410 receives streaming video 411 and the available video quality profiles 413 associated with the streaming video 411 from the CDN 240 (e.g., one of the web servers 116 or proxy caches 118) over the connections 241. The media manager 410 may receive the available video quality profiles 413 in a metadata file from the content server 102 over the connections 241; or alternatively, from the publisher. In another embodiment, the media player 200 receives the available video quality profiles 413, and other types of metadata from a messaging server. The metadata file of the available video quality profiles 413 may describe an entire content file, for example, using a virtual timeline (e.g., QVT) that represents when the media content and the intermittent advertisement breaks are to be sequentially played by the media player 200. The metadata file may include information, such as, for example, a start index, a duration, an end index, whether the content is live, proprietary publisher data, encryption level, content duration, bit rate values, including frame size, audio channel information, codecs used to encode the portions of the video, sample rates, and frame rate. The metadata file may include various parameters about the available video quality profiles 413 for the streaming video 411. The parameters for each of the available video quality profiles 413 may include the width and height of the image (i.e., image size), video bit rate (i.e., rate at which the video is encoded), audio bit rate, audio sample rate (i.e., rate at which the audio is sampled when captured), number of audio tracks (e.g., mono, stereo, or the like), frame rate (e.g., frame per second), staging size, or the like. The available video quality profiles 413 may also include a table indicating the file size of one or more portions (e.g., streamlets as described below) of the streaming video 411, such as the first portions of the requested video.

As described above, although there may be a certain number of available video quality profiles 413, the keys server 130 may limit access to some of the copies for the particular media player 200. The encryption manager 411 sends a key request 341 to the key server 130, and the key server 130 responds with the encryption key or keys 343 and/or instructions 345, as described above. In one embodiment, the encryption manager 411 uses the encryption key(s) 343 and/or instructions 345 to determine which of the available video quality profiles 413 can be used for playback by the media player 200, which may be referred to as the "working video quality profiles." Then the media manager 410 can use the "working video quality profiles" to determine which quality level of video to stream to the media player (i.e., which quality of streamlets to request) in order to change the quality level of the video being requested as part of the adaptive streaming by the media player 200.

The media manager 410 may receive the streaming video 411 over the connections 241 as a sequence of files (e.g., streamlets) for each of the time indexes, and then arrange the files according to the time indexes. In this embodiment, the media manager 410 sends video requests 412 to request portions of the streaming video 411. The media manager 410 may request and receive the files sequentially in time according to the time indexes. Alternatively, the media manager 410 may receive the files in an order that is not sequential in time according to the time indexes. Alternatively, the media manager 410 receives one or more files concurrently, for example, over multiple TCP connections. Although the media content may be segmented into sequential streamlets, and encoded into individual streamlets according to different video quality profiles, the streamlets may be independently requested and received, and independently playable by the media player 200.

The media manager 410 decides what streamlets to request based on any number of given constraints and/or preferences set by, for example, a viewer, the publisher, the web page designer, or constraints and/or preferences generated within the media player 200. For example, the media manager 410 can decide what streamlets to request based on the performance measures 422, staging size (e.g., viewing window), the maximum and/or minimum acceptable video quality profile, the available video quality profiles 413, the available encryption keys 343, or the like. In one embodiment, the performance measures 422 are network performance measures. In another embodiment, the performance measures 422 are computational load measures, such as the current computational load on the CPU or the amount of available processing capability of the CPU. The media manager 410 may also decide based on other factors, including the optimal video quality profile, or the amount of video already available in the media manager 410, for example. In one embodiment, the media manager 410 determines a performance factor of the network as described in U.S. Patent Application Publication No. 2005/0262257, filed Apr. 28, 2005. Alternatively, the media manager 410 can track network performance and generate network performance measures using other techniques that would be appreciated by those of ordinary skill in the art.

In one embodiment, the performance measure 422 is a current bandwidth estimate. In another embodiment, the performance measure 422 is indicative of the available bandwidth of one or more TCP connections (e.g., connections 241 that receive the streaming video 411). In another embodiment, the performance measure 422 is indicative of a current read ahead margin. The current read ahead margin is a current amount of contiguous, sequentially arranged, un-played portions of the video for playback on the media player. In another embodiment, the performance measure 422 is indicative of a minimum safety margin. The minimum safety margin is the smallest size the current read ahead margin should be to avoid interruption or stalling in the playback of the video on the media player. In another embodiment, the performance measure 422 is indicative of latency of the requested portions. The latency is a time measure between when a request is issued and a time that response data of the requested portion begins to arrive at the client device 104. In another embodiment, the performance measure 422 is indicative of time intervals between successive receive times for each response to the requested portions. In another embodiment, the performance measure 422 is indicative of delays or losses in one or more of the TCP connections. In another embodiment, the performance measure 422 is indicative of the number of bytes for a small interval of time, regardless to which streamlet the data belongs. Alternatively, other performance measures may be used, for example, performance measures that relate to the performance of the network, or performance measures that relate to the performance of the client device. The performance measures 422 may be monitored and used by the media manager 410 in predictively selecting the predicted video quality profile for one or more subsequent streamlets. Alternatively, the media manager 410 may monitor and use the performance measure 422 in deciding what video to request, decode, and render. In response, the media player 200 may periodically select the optimal video quality profile for requesting subsequent portions of the video. When played by the media player 200, the streaming video 411 may include streamlets that were encoded according to different video quality profiles.

After the media manager 410 receives the requested streamlets, the media manager 410 then stages the downloaded streamlets into a sequence of streamlets in the order in which the streamlets should be decoded and rendered. In the depicted embodiment, the media manager 410 extracts the video frames 415 from the staged video portion and passes the video frames 415 to the video decoder 430. In one embodiment, the encryption manager 411 communicates with the media manager 410 to decrypt the video using the appropriate encryption key before extracting the video frames 415. In another embodiment, the encryption manager 411 communicates the appropriate encryption keys to the video decoder 430, which handles the decryption of the video. Alternatively, other configurations are possible as would be appreciated by one of ordinary skill in the art having the benefit of this disclosure.

The video decoder 430 decodes the video frames 415 and outputs the decoded video frames 416 to the rendering engine 440. In one embodiment, the video decoder 430 implements the TrueMotion VP7 codec, available from On2 Technologies®. Alternatively, other video decoders may be used. The rendering engine 440 renders the decoded video frames 416, and outputs the rendered video frames 417 to a display. The display may be a viewing window within a GUI, generated by the media player 200. Alternatively, the display may be a screen of the client device, such as a computer monitor, a television screen, or the like.

It should be noted that the embodiments of the media player 200, described and illustrated with respect to FIG. 4, are configured to request, decode, and render video on a display in a pull-based configuration. In other embodiments, the media player 200 may request, decode, and render other types of media content than video, such as audio. Also, it should be understood that in most instances, the term "video," as used herein, refers not only to the sequence of images, but also the corresponding audio, if any, for the sequence of images. Also, in other embodiments, other types of media players can be used, such as media players that stream media content in a push-based configuration, or the like.

Figure 5:
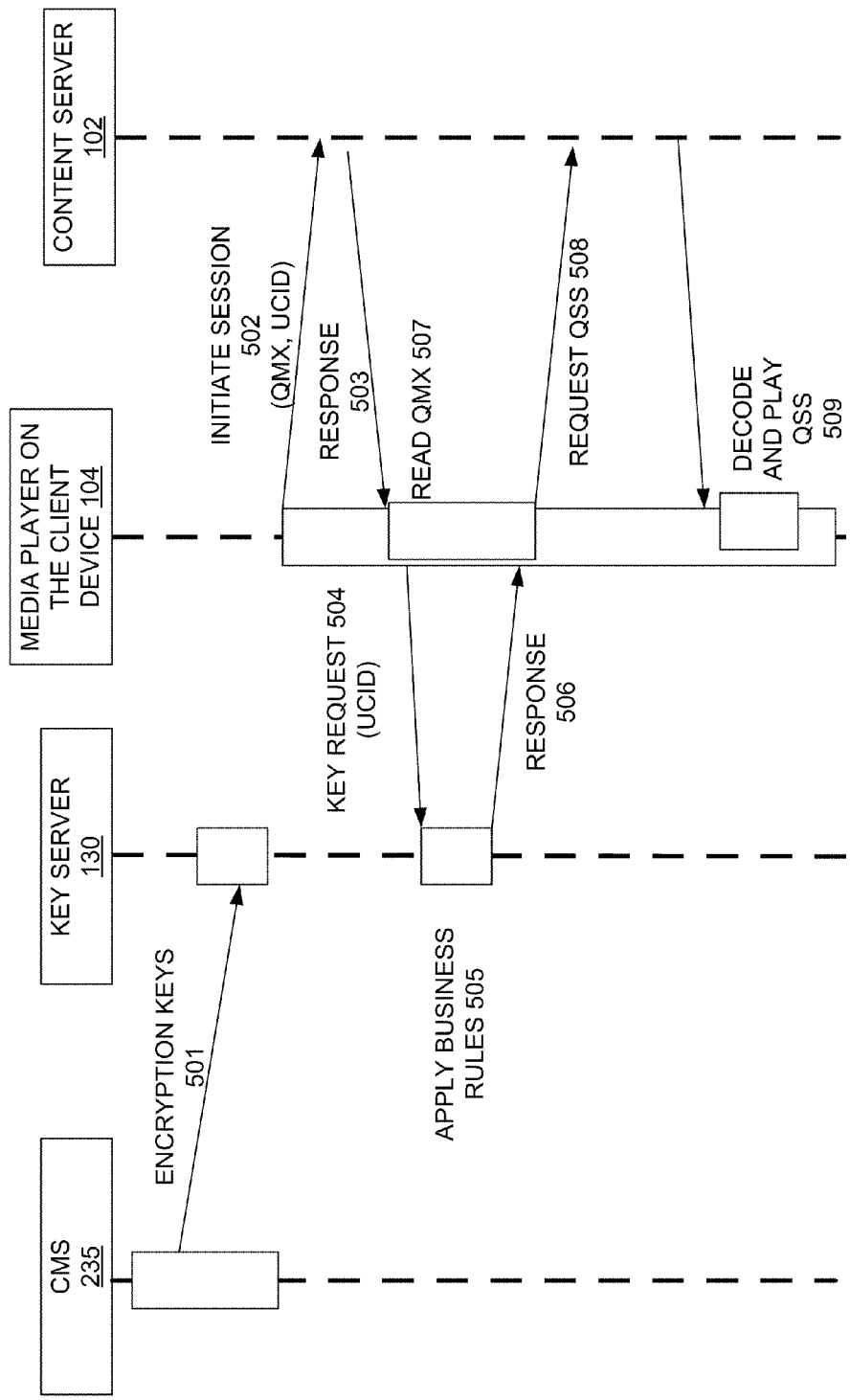
FIG. 5 is a flow diagram of one embodiment of a method of access control of a subset of copies of media content.

FIG. 5 is a flow diagram of one embodiment of a method 500 of access control of a subset of copies of media content. The method 500 is performed by processing logic on the respective devices, the CMS 235, the key server 130, and the client device 104. In this embodiment, the CMS 235 sends 501 the encryption keys to the key server 130. This may be done in response to the CMS 235 receiving the encryption keys from the encoder 220, or in response to user interaction. The CMS 235 may identify the encryption keys using a UCID for the particular media content. The key server 130 waits to receive a key request. In response to input at the media player, such as a user selecting the media content to be presented, the media player 200, operating on the client device 104, initiates 502 a session with the content server 102. The media player, as part of initiating the session, may request a QMX file. Alternatively, the QMX file can be pushed from the content server 102 as part of initiating the session. The content server 102 sends 503 a response, acknowledging that the session is initiated. The response may also include the requested or pushed QMX file. After initiating 502 the session, the media player sends 504 a key request to the key server 130 to request playback permission for the particular media content. Alternatively, the media player sends 504 the key request before initiating 502 the session. The key request may include the UCID of the requested content. The media player can send the key request before or after receiving the response from the content server 102. The key server 130, using the information of the key request, applies 505 one or more business rules to determine which of the different quality copies the media player 200 can playback, and sends 506 the response to the media player. The response may include a single encryption key for all the copies, an encryption key for each of the copies of the subset (i.e., authorized copies), or all encryption keys for each of the available copies. The response may also include instructions to prevent playback of copies that are not part of the subset or media types that are not allowed. When the media player receives the QMX, the media player can read 507 the QMX file to determine which QSS files to request and the location of those files. After receiving the response from the key server 130, the media player requests 508 from the content server 102 a QSS file from one of the subset of copies for which the media player has received an encryption key. In another embodiment, the media player can start requesting 508 QSS files from a quality profile for which the media player expects to receive the encryption key. However, if the encryption key is not received for the requested QSS files, these files cannot be played, and the media player will need to request QSS files from another quality profile for which encryption keys were received, if any. When the QSS files are received from the content server 102, the media player decodes and plays 509 the QSS files using the appropriate encryption key, presenting the media content to the user on a display of the client device 104.

Figure 6A:
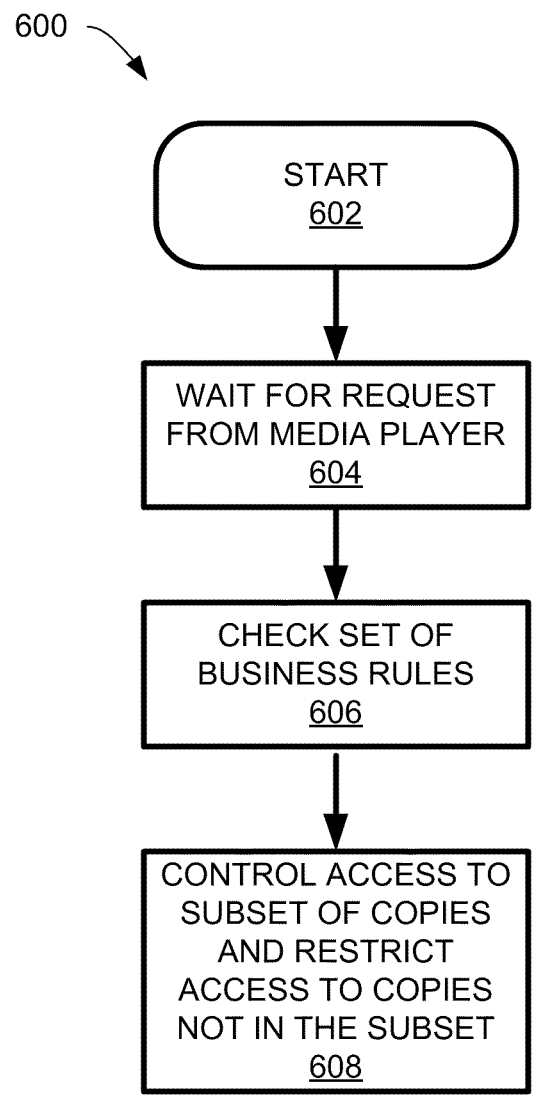
FIG. 6A is a flow diagram of one embodiment of a method of controlling access to copies of the media content by a client device.

FIG. 6A is a flow diagram of one embodiment of a method 600 of controlling access to copies of the media content by a client device. The method 600 is performed by processing logic that may include hardware (circuitry, dedicated logic, or the like), software (such as is run on a general purpose computer system or a dedicated machine), firmware (e.g., embedded software), or any combination thereof. In one embodiment, the method 600 is performed by the key server 130 of FIGS. 1-5. In another embodiment, some of the operations of the methods may be performed by other computing devices than the key server 130.

In FIG. 6A, processing logic starts (block 602) by waiting for a key request from a media player (block 604) for playback permission of media content on a client device. Once a key request is received, the processing logic applies a set of one or more business rules to determine which of the different quality copies of the media content, if any, can be played back on the client device (block 606). Based on the results of the business rule processing, processing logic allows access to a subset of the copies and restricts access to the copies that are not in the subset (block 608). The subset represents the copies of the media content that the requesting client device is authorized to playback. In one embodiment, the processing logic allows access by sending access information, such as encryption keys and/or instructions to allow playback of the copies of the subset and to prevent playback of the copies that are not part of the subset on the client device.

Figure 6B:
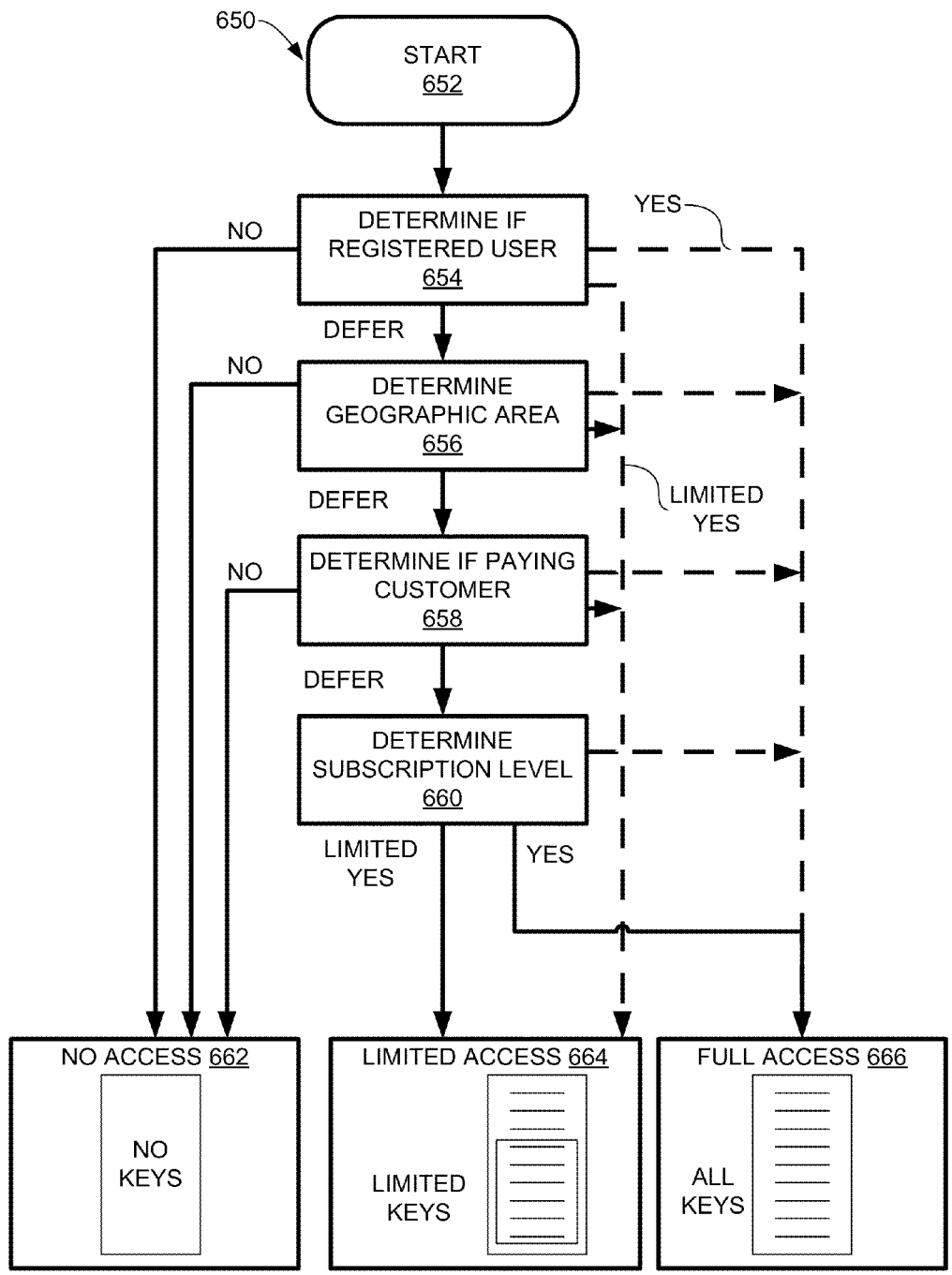
FIG. 6B is a flow diagram of one embodiment of a method of performing exemplary business rules to determine which copies, if any, can be played back on a client device.

FIG. 6B is a flow diagram of one embodiment of a method 650 of performing exemplary business rules to determine which copies, if any, can be played back on a client device. The method 650 is performed by processing logic that may include hardware (circuitry, dedicated logic, or the like), software (such as is run on a general purpose computer system or a dedicated machine), firmware (e.g., embedded software), or any combination thereof. In one embodiment, the method 600 is performed by the key server 130 of FIGS. 1-5. In another embodiment, some of the operations of the methods may be performed by other computing devices than the key server 130, such as a remote server.

In FIG. 6B, processing logic starts (block 652) by determining if the user of the requesting media player is a registered user (block 654). If not, processing logic determines that the requested media player should not have access (block 662) and no keys are sent back to the media player. The processing logic may notify the media player that access has been denied, for example, by sending an error message back to the requesting media player. At block 654, if the requesting media player is a registered user, the processing logic may defer to the next business rule to determine whether to grant full or limited access. Upon deferring at block 654, the processing logic determines a geographic area of the requesting media player (block 656). In one embodiment, the key request includes the network address of the requesting media player, and the processing logic extracts the network address to determine if the network address is within an approved geographic area. If the network address is not in the approved geographic area, the processing logic determines that the requested media player should not have access (block 662) and no keys are sent back to the media player. At block 656, if the requesting media player is within the approved geographic area, the processing logic may defer to the next business rule to determine whether to grant full or limited access. Upon deferring at block 656, the processing logic determines if the requesting media player is a paying customer (block 658). If not, the processing logic determines that the requested media player should not have access (block 662) and no keys are sent back to the media player. At block 658, if the requesting media player is a paying customer, the processing logic may defer to the next business rule to determine whether to grant full or limited access. Upon deferring at block 658, the processing logic determines a subscription level of the requesting media player (block 660). If the requesting media player is a paying customer, the processing logic can grant access (block 666) or limited access (block 664). If full access is granted at block 660, the processing logic sends all the encryption keys to the requesting media player at block 666. If limited access is granted at block 660, the processing logic sends a subset of the encryption keys (i.e., less than all the encryption keys) to the requesting media player at block 664. In one embodiment, the subset of encryption keys does not include the encryption keys for one or more of the highest quality levels. Alternatively, other combinations of quality levels can be included in the subset. In another embodiment, instead of sending a subset of encryption keys of the authorized copies that can be played back on the requesting media player, the processing logic can send a single encryption key for all the copies and instructions to prevent the requesting media player from playing copies that are not part of the authorized subset. In another embodiment, the processing logic sends all the encryption keys for each of the copies and instructions to prevent the requesting media player from playing copies that are not part of the authorized subset. In another embodiment, the processing logic sends the encryption keys and instructions to prevent the requesting media player from playing either the audio or the video.

It should be noted that any of the business rules can be configured to grant access at block 666 or limited access at block 604 in response to the result of the particular business rule (as indicated by hashed lines in FIG. 6B), instead of deferring to the next business rule as described above. It should also be noted that these business rules are merely examples and that more or less business rules may be performed as part of the method, and other types of business rules may be performed as well. Similarly, the order of these business rules is merely an example of how business rules can be performed, and based on the results, the processing logic can control access, by denying access, granting access, or granting limited access as described above. One of ordinary skill in the art, having the benefit of this disclosure, would appreciate that other types of business rules may be performed to control access to the media content.

Figure 7:
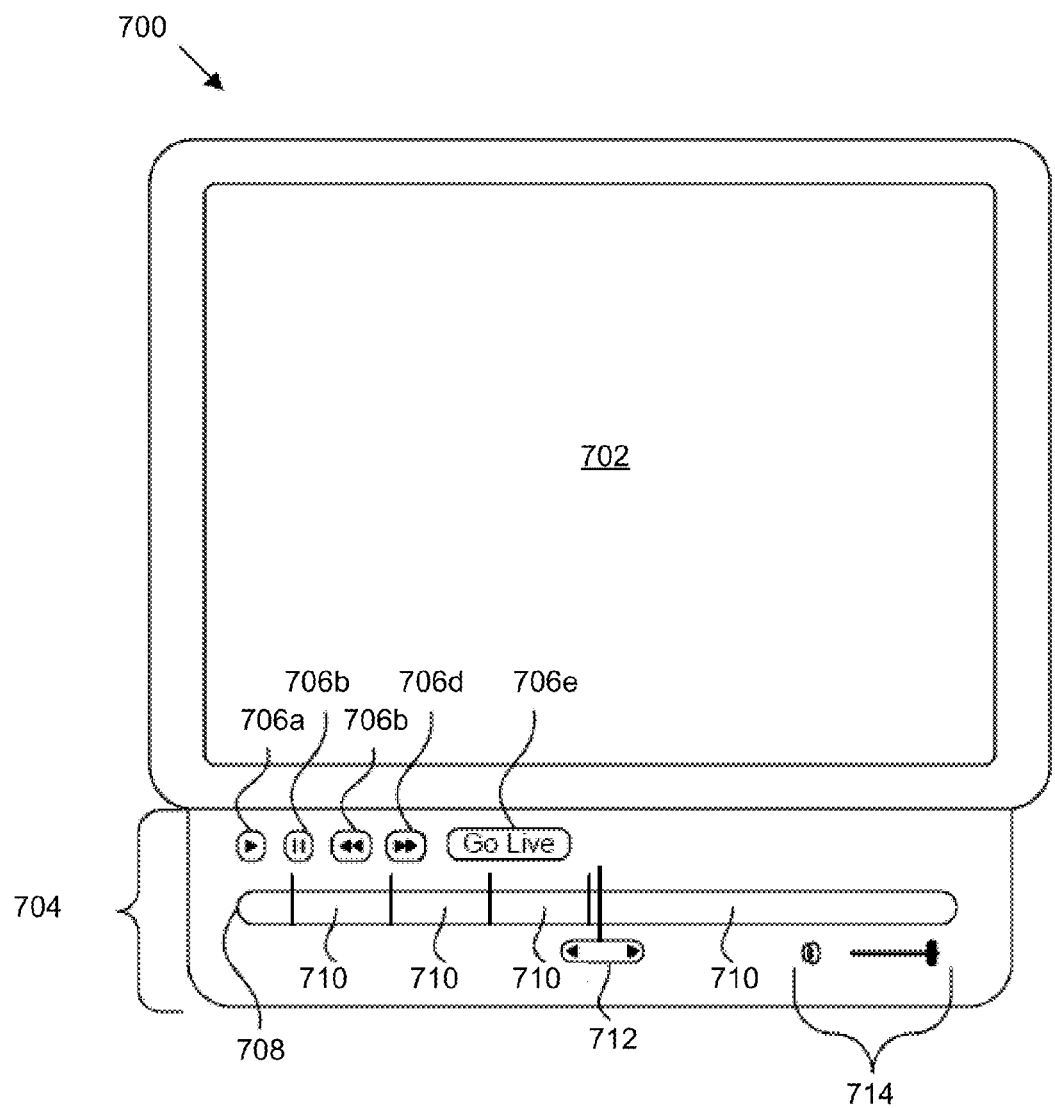
FIG. 7 illustrates a graphical user interface (GUI) of a media player in accordance with one embodiment.

FIG. 7 illustrates a GUI 700 of the media player 200 in accordance with one embodiment. The depicted GUI 700 of the media player 200 includes a viewing area 702 located above a control area 704. The viewing area 702 is configured to display the decoded and rendered media content and advertisements, and may be resized according to a personal preference, or in order to accommodate various forms of audio/video. The control area 704 includes buttons 706 for controlling playback of the media content. The buttons may include, but are not limited to, play 706a, pause 706b, rewind 706c, and fast forward 706d.

In the depicted embodiment, the GUI 700 further includes a timeline 708 that is configured to represent the available content. The timeline 708 is similar to a programming guide for a TV station. The portions 710, as depicted, may correspond with different television shows, or portions within the same television show. The status bar 712 indicates the current position relative to the timeline 708 of the content. In one embodiment, the status bar 712 may be "dragged" to the right in order to fast forward through the content and likewise to the left in order to rewind. The GUI 700 of the media player 200 may also include volume controls 714. The programs playing at selected times may also be listed on the timeline 708. The GUI 700 may include other buttons that correspond to additional functionality of the media player 200, such as adjusting the playback window to full-screen, mini-mode, a pop-out player window, additional playlist or content navigation aids.

In one embodiment, the media player 200 generates the GUI 700. The media player 200 may be software that is downloaded to the client device 104 prior to the user viewing the requested video. The media player 200 may be an add-on or plug-in to a web browser, or may be a stand-alone application by itself. In one embodiment, the client device 104 requests a video to stream, and the content server 102 provides the client device 104 with the media player 200 that generates the GUI 700 in which video may be displayed in the viewing area 702. In another embodiment, the client device 104 requests to download the player and installs the media player 200 on the client device 104 before requesting the video to stream. Alternatively, other configurations are possible, such as hosting the media player 200 from another device on the network, but displaying the GUI 700 on the client device 104, or the like.

FIG. 7 illustrates by way of example only, and one skilled in the art would appreciate that the GUI 700 of the media player 200 may be implemented with many different styles and orientations according to the available functionality of the media player 200.

The embodiments described herein may provide access information to media players that are streaming media content using a pull-based network, using, for example, Hypertext Transfer Protocol (HTTP). Alternatively, the embodiments described herein may be used in other delivery schemes. In a push-based model, the media server may contain processing logic that selects which quality level to send to a media player. In particular, the processing logic selects which copy of the media content to play. In these embodiments, the same business rules as described herein can be used by the media server to derive the subset of allowed copies of the media content. This server-side processing logic may consider only the copies in the subset, and ignore any copies that are not in the subset in selecting which of the copies to deliver to the media player. The embodiments described herein may prevent media players from requesting media content to which they should not have access. The embodiments described herein allow for a tiered subscription server, in that the key server can be used to control access to the copies of the media content according to subscription levels. For example, one subscription level allows the media player to request only copies of the lower quality levels, while another subscription level allows the media player to request all copies at all quality levels. The embodiments described herein allow the content owners to control access to the different quality levels of the media content, and control the higher costs often associated with encoding, storing, and delivering higher quality content. Using the embodiments described herein, the content owners can offer to "paying" customer the higher quality versions, while restricting access to the higher quality versions to "non-paying" customers, for example. Similarly, using the embodiments described herein, the content owners can encode and offer a demonstration video at a high quality, while restricting access to the demonstration video by the general public. These embodiments also provide the flexibility to offer a free version of the video at a lower quality, enticing the customers to sign up for a paid subscription to view the higher quality versions of that video or other videos. These embodiments also provide the ability to control access using other criteria, such as on a per-user basis, a per-network basis, a per-geographic region basis, a per-rate basis, or the like. The embodiments described herein also allow the content owners the ability to encode the media content at various quality levels and store them on a content server, while controlling access to the higher quality versions. The embodiments described herein also allow access control that cannot be easily circumvented by customers.

It should be noted that various devices (e.g., client device, servers, publisher, etc.) as described herein are physical machines (e.g., computing devices), within which a set of instructions, for causing the machine to perform any one or more of the methodologies discussed herein, may be executed, such as a computer or a collection of computers that execute instructions. As would be appreciated by one of ordinary skill in the art having the benefit of this disclosure, the various devices may include one or more memory devices to store the instructions, and one or more computing devices to execute the instructions. The memory devices may be, for example, read-only memory (ROM), EPROMs, EEPROMs, flash memory, dynamic random access memory (DRAM) such as synchronous DRAM (SDRAM), flash memory, static random access memory (SRAM), a data storage device, or the like). The computing devices may be, for example, one or more general-purpose computing devices such as a microprocessor, central processing unit, a complex instruction set computing (CISC) microprocessor, reduced instruction set computing (RISC) microprocessor, very long instruction word (VLIW) microprocessor, processor implementing other instruction sets, processors implementing a combination of instruction sets, one or more special-purpose computing devices such as an application specific integrated circuit (ASIC), a field programmable gate array (FPGA), a digital signal processor (DSP), network processor, or the like. The various devices may include other components, as would be appreciated by one of ordinary skill in the art having the benefit of this disclosure.

The various machines may be networked in a Local Area Network (LAN), an intranet, an extranet, or the Internet 106. The devices may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, the term "machine" shall also be taken to include any collection of machines (e.g., computing devices) that individually or jointly execute a set (or multiple sets) of instructions to perform any one or more of the methodologies discussed herein.

The memory devices may be a machine-readable storage medium on which is stored one or more sets of instructions (e.g., software) embodying any one or more of the methodologies or functions described herein. The software may also reside, completely or at least partially, within the memory device and/or within the computing device during execution thereof by the computing device. The software may further be transmitted or received over a network, and stored in the memory device and/or the computing device to be executed by the computing device. The term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by a machine and that cause the machine to perform any one or more of the methodologies of the present invention. The term "machine-readable storage medium" shall accordingly be taken to include, but not be limited to, solid-state memories, and optical and magnetic media, non-volatile memory (NVM), and the like.

The algorithms and displays presented herein are not inherently related to any particular machine or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method executable by a computerized key server communicating on a network, the method comprising:
storing, at the key server, a set of encryption keys each corresponding to one of a plurality of different copies of a media content, wherein each of the different copies of the media content is stored on a content server separate from the key server, wherein each of the plurality of different copies is made up of a set of individually-requestable data segments each representing a portion of the media content, and wherein each of the sets of individually-requestable data segments represents a different version of the same media content encoded according to one of a plurality of different quality levels in a separate file that is individually identifiable and requestable from the separate content server by a client device;
subsequently receiving a request for playback permission from the client device by the key server, wherein the request for playback permission comprises information that identifies the client device and an identifier of the media content;
using the information of the request for playback permission received at the key server, applying a set of one or more business rules by the key server to determine which of the sets of individually-requestable data segments representing different versions of the same media content, if any, are approved for playback on the client device;
sending access information from the key server to the client device, the access information comprising a key file containing encryption keys for multiple ones of the different copies of the media content that are approved for playback on the client device to thereby allow the client device to adaptively request data segments from any of the different copies of the media content that are approved for playback by the client device.

2. The method of claim 1, wherein the set of encryption keys is received from a content management system that is associated with a publisher of the media content.

3. The method of claim 1, wherein the access information sent from the key server to the client device comprises the different encryption keys for the different copies of the media content that are approved for playback on the client device but does not comprise the encryption keys for the different copies of the media content that are not approved for playback on the client device.

4. The method of claim 1, wherein the access information controls the type of media content that can be played back on the client device.

5. The method of claim 1, wherein the access information comprises:
instructions that prevent playback of the different copies that are not approved for playback on the client device.

6. The method of claim 5, wherein the instructions comprise instructions that specify a maximum duration of permitted playback of one or more of the plurality of different copies.

7. The method of claim 1, wherein the at least one of the copies of the media content that is not approved for playback by the client device is encoded according to a higher quality level than the at least one of the copies of the media content that is approved for playback by the client device.

8. The method of claim 7 wherein the set of cryptographic keys is generated by an encoder that encodes each of the different copies of the media programs according to the plurality of different quality levels, and wherein the different copies of the individually-requestable data segments of the different copies are encrypted prior to storage on a content delivery network (CDN) that is separate from the key server.

9. The method of claim 1, wherein the method further comprises extracting a network address of the client device from the request, and wherein the applying of the set of business rules comprises determining if the network address is located in an approved geographic area to view the media content and, if the network address is not located in an approved geographic area, then not identifying the individually-requestable data segments associated with the media content to the client device.

10. The method of claim 1, wherein the plurality of different copies of the media content are encoded at the plurality of different quality levels according to a plurality of quality profiles, and wherein the applying of the set of business rules comprises determining which of the plurality of quality profiles meets a maximum or minimum criterion for a parameter of the quality profile.

11. The method of claim 10, wherein the maximum or minimum criterion is at least one of the following:
a maximum or minimum bit rate;
a maximum or minimum frame rate;
a maximum or minimum frame size;
a maximum or minimum image size; and
a maximum or minimum staging size.

12. The method of claim 1, wherein the applying of the set of business rules comprises determining a subscription level for the client device using an identifier for the client device, wherein the subscription level specifies which of the plurality of different copies of the media content, if any, can be played back on the client device.

13. The method of claim 12, wherein said determining comprises:
requesting the subscription level from a remote server; and
receiving the subscription level from the remote server at the key server.

14. The method of claim 1, wherein said receiving comprises receiving a token key from the client device, and wherein the applying of the business rules comprises validating the token, wherein the token specifies which of the plurality of different copies, if any, are approved for playback on the client device.

15. A computer-implemented key server, comprising:
a computing device configured to communicate with a network;
a data storage configured to store a set of encryption keys associated with a media content, wherein each of the encryption keys in the set corresponds to a different copy of a media content encoded at a different quality level, and wherein each of the different copies of the media content is stored on a content server separate from the key server; and
a rules engine executable on the computing device that is configured to receive a request over the network for playback permission of the media content by a client device that comprises information that identifies the client device and the media content to be viewed using the client device, and wherein the rules engine is configured to:
- apply a set of one or more business rules using information of the request to determine which of the sets of individually-requestable data segments representing different versions of the same media content, if any, are approved for playback by the client device; and
- send access information comprising a key file containing encryption keys for multiple ones of the different copies of the media content that are approved for playback on the client device to thereby allow the client device to adaptively request data segments from any of the different copies of the media content that are approved for playback by the client device using the access information.

16. The server of claim 15, wherein the rules engine allows access by sending the access information to the client device to allow playback of the copies that are approved for playback on the client device and to prevent playback of the copies that are not approved for playback on the client device.

17. The server of claim 15, wherein the access information controls the type of media content that can be played back on the client device.

18. The server of claim 15, wherein the access information comprises:
- instructions that prevent playback of the copies that are not approved for playback on the client device.

19. The server of claim 18, wherein the instructions comprise instructions that specify a maximum duration of permitted playback of one or more of the plurality of copies.

20. The server of claim 15, wherein the request for playback permission comprises a key request for a key file identified by an identifier of the media content.

21. The server of claim 15, wherein the copies that are approved for playback on the client device are encoded at a lower quality level than the copies of the same media content that are not approved for playback on the client device.

22. A method executable by a media player device to playback a media program received from a content server via a network, the method comprising:

initiating a session with the content server to thereby obtain information about the media program, wherein the information describes multiple different copies of the media program that are available from the content server, each of the multiple different copies being made up of a plurality of individually-requestable media segments and being encoded at a different quality level;
forwarding at least some of the information about the media program obtained from the content server to a key server via the network, wherein the key server is separate from the content server, to thereby allow the content server to authorize the media player device to playback the multiple different copies of the media program;
receiving a response from the key server that comprises a key file containing encryption keys associated with the multiple different copies of the media program that are approved for playback on the client device to thereby allow the media player device to adaptively request data segments from any of the multiple different copies of the media content that are approved for playback on the media player device;
requesting individual media segments of the multiple different copies of the media program that are authorized for playback from the content server;
decrypting the requested individual media segments using the encryption key received from the key server that is associated with the copy of the media program from which the individual media segment was requested; and
rendering the decrypted media segment for playback by the media player device.

23. The method of claim 22 wherein the key server authorizes the playback of the multiple different copies of the media program based upon business rules.

24. The method of claim 22 wherein the content server is implemented within a content delivery network (CDN) so that the requesting of individual media segments is performed by issuing HTTP GET requests from the media player device to the content delivery network.

* * * * *